Dec. 4, 1962                 D. G. GLUCK            3,067,078
TREATMENT OF POLYMERIC FLUORINE-CONTAINING
RESINS AND RESULTING PRODUCTS
Filed July 28, 1960
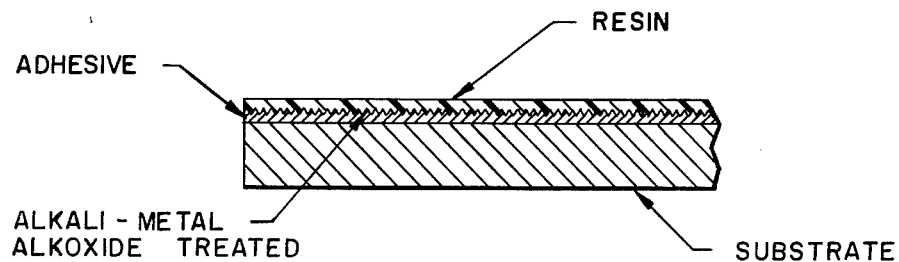
INVENTOR.
DAVID GLUCK
BY
ATTORNEY 3,067,078
TREATMENT OF POLYMERIC FLUORINE-CONTAINING RESINS AND RESULTING PRODUCTS
David G. Gluck, Akron, Ohio, assignor to United States Stoneware Company, Tallmadge, Ohio, a corporation of Ohio
Filed July 28, 1960, Ser. No. 45,903
19 Claims. (Cl. 154—43)

This invention relates to the treatment of polymeric fluorine-containing resins having a passive, heat-reflective surface, the adherence of adhesives to the treated surfaces and the adherence of substrates to such adhesives. The invention includes not only the processes, but the resulting products as well.

The polymeric resins to which the invention relates include polyvinyl fluoride, polyvinylidene fluoride, and other plastic homopolymers and copolymers of olefins having a high fluorine content which gives them a passive surface. These resins include, for example, the following commercial polymers:

(1) High molecular weight homopolymer of monochlorotrifluoroethylene. Known as Kel-F300.
(2) Low molecular weight homopolymer of monochlorotrifluoroethylene. Known as Kel-F270.
(3) Low molecular weight copolymer of monochlorotrifluoroethylene and a relatively large amount of vinylidene fluoride. Known as Kel-F800 and Kel-F820.
(4) Copolymer of monochlorotrifluoroethylene and a relatively small amount of vinylidene fluoride. Known as Kel-F550 and Genetron VK-240.
(5) Homopolymers of vinyl fluoride; films with a melting point of approximately 390° F. and oriented to different extents. Known as Teslar 20, 30 and 40.
(6) Homopolymer of tetrafluoroethylene with a transition point of about 620° F. Known as Teflon.
(7) Copolymer of tetrafluoroethylene and hexafluoropropylene with a transition point of about 545° F. Known as Teflon X100.
(8) Homopolymer of vinylidene fluoride.
(9) Copolymer of vinylidene fluoride and hexafluoropropylene. Known as Viton.

The fluorine-containing polymers identified in the second paragraph of Purvis U.S. 2,789,063 are included. The Kel-F products are manufactured by Minnesota Mining Company; the Genetron product is manufactured by General Chemical Division of Allied Chemical Company; the Teslar, Teflon and Viton products are manufactured by E. I. du Pont de Nemours & Co. The homopolymers of vinylidene fluoride are manufactured by Pennsalt Chemical Company. The foregoing are illustrative. The Teflon products are so passive that even after the treatment of this invention they evidence only slight adhesion, though better than before the treatment. The perhaloolefins preferably are those which contain at least one chlorine as well as at least one fluorine. Thus the polymeric resin is advantageously derived from dichlorodifluoroolefin or trichloromonofluoroolefin, and either of these may be copolymerized with any one or more of many ethylenically unsaturated monomers. The polymer may be a mixture of any two or more of the foregoing or a mixed polymer derived from mixed monomers.

The surface of an object made from any of these polymeric resins is passive and heat reflective. It is transparent to most infrared waves. Also, it is not readily wetted. It softens at a temperature in the range of 200 to 700° F.

The surface of all such resins is known to be resistant to adhesives. Even the most adherent adhesives peel from such surfaces with the application of only a small force; their adherence to the Teflons is substantially nil.

According to this invention a surface of such a polymeric resin is etched by treatment with an alkoxide of a metal of group I, II or III of the periodic table, the metal of which can be sodium, potassium, lithium, rubidium, caesium, beryllium, calcium, magnesium, strontium, barium, zinc, boron, aluminum, etc. The alkoxide is derived from any alcohol having an alkyl group of one to eight carbon atoms. Adhesives adhere readily to the etched surface and form a strong bond with it. Although sodium alkoxide, and preferably sodium methoxide or sodium ethoxide is usually employed, compounds of any of the indicated metals with any of the higher alcohols of 1 to 8 carbon atoms may be used. The treating agent may be derived from a mixture of metals and a mixture of alcohols.

The resin is heated briefly after applying the metal alkoxide, as in an oven, or it is heated before the metal alkoxide is brought into contact with it, and in the latter case the polymer is preferably so hot that the further application of heat is not necessary. The heating is limited to prevent objectionable evolution of decomposition gases because they are poisonous. The temperature to which the resin is heated to bring about the reaction is not critical provided it is in the neighborhood of the transition temperature of the polymer, or above; the reaction is more rapid at higher temperatures than at lower temperatures.

Halide ions have been found in wash water used to remove the metal oxide remaining after treatment of the resin, indicating that there has been a chemical change in the polymer surface as well as an increase in its surface area as a result of the etching.

The resin may be any size and any shape. Usually it will be in the form of a film 5 to 80 mils thick. A particularly valuable application of the process of the invention is to films only about 20 or 30 mils thick. A substrate of metal, cloth, ceramic, wood, plastic, plastic foam, or the like can be laminated to such a film to make a variety of useful products. For instance, a polymeric film may be adhered to a base material to form corrosion-resistant lining for piping, liners for containers for corrosive liquids, surface films for chemical-reaction equipment, etc. Thus, reinforced polyester vessels, containers, etc. can be fabricated directly onto a pre-formed liner of the polymeric film which has been surface treated as described herein. Batch or continuous conveyors for very tacky or sticky surfaces can be made with liners of the polymeric film the unexposed surface of which has been treated with metal alkoxide and then adhered to a suitable substrate.

Structural adhesives form a strong bond with the etched polymer surface. The adhesive may be one which is activated by heat or it may be an adhesive that is effective when applied at room temperature. The adhesive may be foamed prior to or during application. Suitable adhesives include, for example, epoxy adhesives, acrylic-base adhesives, silicon-base adhesives, phenolic-nitrile-base adhesives, polyurethane, and polyurethane plus an epoxy and/or an epoxynovalac resin, etc. The urethane and acrylic-base adhesives are not heat resistant; the epoxy, silicone-base and phenolic-nitrile-base adhesives are heat resistant and find valuable applications with the heat-resistant fluorine-containing polymers. (By a phenolic-nitrile-base is meant a butadiene-acrylonitrile copolymer which has been reacted with a phenol-formaldehyde resin.) The adhesive, if liquid, may be applied without a liquid carrier. Solutions in water and solutions in organic solvents can be used. Also, the adhesive may be applied as a hot melt. Some adhesives form a stronger bond than others, but it is a rule that all adhesives form a better bond with the etched surface than with the passive, heat-reflective, untreated surface.

The test of adhesion is known as a peel test. It is the force required to pull a specimen one inch wide from a substrate surface at an angle of 90 degrees to the substrate to which it is adhered. Reference will be made to this peel test in what follows.

The invention will be described more particularly in connection with the following examples and the accompanying drawing which shows a section through a film of the polymer, greatly magnified. The lower surface has been etched, and a substrate has been united to it by an adhesive.

It is generally desirable to first clean the surface of the polymeric resin. It is then coated with a thin, uniform layer of a metal alkoxide. The amount of the alkoxide used is not critical, but the coating, if very thin, should be uniform. A coating less than 2 mils thick has been found satisfactory. If the coated surface is to be heated by infrared heat, the coating must be of sufficient opacity to insure the desired absorption of the infrared rays.

The metal alkoxide coating may be deposited from a solution or suspension in an organic solvent, such as ethyl ether. Care should be taken to maintain the coated sheet above the dew point of the surrounding atmosphere, especially during evaporation of the solvent because condensation of moisture on the alkoxide will decompose it, rendering it useless.

The following examples are illustrative:

EXAMPLE 1

A film of Kel-F300 measuring 6" x 15" and 20 mils thick was thoroughly cleaned with methylisobutyl ketone and then air dried for 10 minutes. The cleaned surface was spray-coated with 200 cc. of a 15-percent solution of sodium methoxide in methanol. A damp uniform coating of sodium methoxide adhered to the film. Care was taken that the sheet did not cool below the dew point of the ambient air.

The coated sheet was taped to an aluminum plate with the coating away from the plate. This was heated in an oven at 450° F. for 6 minutes. On removal from the oven it was immediately quenched in cold water to retain the flexibility of the Kel-F sheet. The water removed the sodium methoxide and decomposition products contained in it. The sample was washed again, this time in warm water, and then with methylisobutyl ketone. It was dried thoroughly. The treated surface of the film had the appearance of etched glass. It was not discolored.

Two test strips pre-treated as above, each one inch wide, were prepared as follows: An adhesive comprising one part Epon 828 (condensation product of epichlorhydrin and p,p'-isopropylidine diphenol manufactured by Shell Chemical Company) and one part Versamid 125 (a liquid polyamide of the General Mills Company) was brushed on to a phenolic tape adhesive which had been pre-cured on to a sandblasted aluminum panel. This gave a smooth receptive surface for the adhesive. The etched surface of the Kel-F film was placed against the adhesive covering under a pressure of approximately five pounds per square inch. Each of these test pieces was allowed to cure for 20 hours at room temperature. Each strip was peeled from the resin film at a speed of 2 inches per minute with the following results which are compared to the result obtained with untreated Kel-F film. The results are expressed in pounds per inch width.

Peel Test

| Sample: | Average, lb./in. |
|---|---|
| Treated Kel-F | 20 |
| Treated Kel-F | 26 |
| Untreated Kel-F | 6 |

EXAMPLE 2

A film of Genetron VK-240 measuring 6" x 15" and 30 mils thick, was cleaned with methylisobutyl ketone. It was air dried for 10 minutes and then clamped firmly in an angle-iron frame beneath an infrared heater having an output of 3600 watts per square foot. The film was heated to approximately 125° F. A dispersion of sodium ethoxide in ethyl ether was applied in such quantity as to form an opaque surface layer upon evaporation of the ether.

An aluminum shield was inserted between the heater and coated sheet and the heater was allowed to warm up for 3 minutes. The aluminum plate was then removed and the coated Genetron sheet was brought to a distance of 6 inches from the heater and held there. White fumes began evolving after 30 seconds. They had all but ceased after 2 minutes. Composition of the fumes is unknown, but they can easily be vented through a hood. After 3 minutes the heater was turned off, the protective aluminum shield reinserted between the heater and the coated sheet, and the sheet was allowed to cool slowly. A white salt-like powder remained on the sheet. This was easily removed with water.

Three film samples were cut into 1-inch strips. These were bonded to a sand-blasted aluminum plate with two parts of Epon 828 and one part of Versamid 125. The bond between the aluminum plate and the adhesively coated film was obtained by mere contact pressure for a period of 20 minutes at a temperature of 280° F. The three strips were then peeled from the aluminum at a rate of 2 inches per minute and the results are recorded below in pounds per inch width, compared to the result obtained with untreated film similarly processed.

Peel Test

| Sample: | Test value, lb./in. |
|---|---|
| No. 1 | Between 28 and 37. |
| No. 2 | Between 20 and 40. |
| No. 3 | 20. |
| Untreated Genetron film | 11. |

EXAMPLE 3

A sheet of Teslar 20, 4 mils thick, measuring 6" x 8" was clamped firmly in a rectangular angle-iron frame exposing an area of the film measuring 4" x 6". This exposed area was thoroughly wetted with about 25 cc. of a solution containing approximately 3 grams of sodium methoxide per 100 cc. of solvent; the solvent being composed of 70 percent (by volume) of methyl alcohol and 30 percent of t-butyl alcohol.

The excess solution was almost immediately poured off of the film, and the film was immediately placed in an oven at 190° C. while still clamped in the frame. After 6 minutes the frame was removed from the oven and quenched in cold water. After washing with water and then acetone, and drying, the treated area had the appearance of etched glass.

A sand-blasted aluminum panel was coated with an adhesive prepared by mixing 2 parts of Ciba 6030 (an epoxy resin probably derived from a bisphenol, such as bisphenol A, and epichlorhydrin) and 1 part of Versamid 125. The treated surface of the film was pressed against the adhesive covering. The adhesive and film were heated at 250° F. for thirty minutes with mere contact pressure. The bond formed was of such strength that the treated film could not be peeled from the aluminum panel without breaking. An attempt to bond the same Teslar film to an aluminum panel under exactly the same conditions, but without pre-treating the film surface, was unsuccessful.

EXAMPLE 4

A sheet of Teslar 20, 4 mils thick, was prepared with sodium methoxide identically as described in Example 3, and washed and dried as there described.

The adhesive was prepared from the following:

12 parts by weight Vibrathane 6004 (liquid polyurethane)
1.1 parts of Picco 10 (liquid hydrocarbon resin)
1.1 parts of 4,4'-methylene-bis(2-chloroaniline)
2 parts of Epiphen 823 (epoxy novolac resin)

The components were blended at approximately 100° C., allowed to cool and spread on a sandblasted aluminum panel to form a layer approximately ⅛-inch thick. The surface of the treated film was pressed against the adhesive layer under slight pressure and allowed to cure 16 hours at room temperature. It was then post-cured 30 minutes at 310° F. under about 5 p.s.i. pressure. The adhered film was cut into strips 1-inch wide for use in a peel test.

The film could not be peeled from the adhesive; rather, the adhesive and film peeled from the sandblasted aluminum panel. Average bond strength was 50 pounds per inch.

The panel was aged for 24 hours at 350° F., and a second strip was peeled at room temperature. Peel strength between the film and the adhesive was 10 pounds per inch.

After aging 7 days at 350° F., the peel strength between film and adhesive was 8 pounds per inch.

Such high peel strengths after being heat-aged as described, are unusual, particularly with these resistant plastics.

EXAMPLE 5

A 4" x 6" sample of 10-mil Genetron VK-240 film was dipped in a solution containing 5 g. of sodium methoxide per 30 grams of tert-butyl alcohol and 70 grams of methanol. A thin, uniform, damp coating remained on the sheet after removal from the solution. The sheet was immediately placed in an oven at 190° C. for 3 minutes, removed, and quenched immediately in cold water. After drying, the treated surfaces had a foggy appearance.

A sandblasted aluminum panel was coated with an ⅛-inch thickness of a silicone adhesive (General Electric XR–520) in xylene solution to which had been added 1 percent benzoyl peroxide (based on silicone) as catalyst. The treated film was pressed against the silicone (after evaporation of the xylene) and the assemblage was press-cured at 350° F., 15 p.s.i. pressure for 15 minutes.

Three 1-inch strips were peeled at room temperature. The bond failed cohesively at an average of 6 lbs./in.

EXAMPLE 6

The treating solution utilized in this example had the following composition:

Aluminum isopropoxide _____ grams __ 50
Isopropyl alcohol _____ cc __ 800
Tert-butyl alcohol _____ cc __ 200
Benzene _____ cc __ 200

A 4" x 6" sample of 10-mil Genetron VK-240 film was thoroughly wetted on one side with 20 cc. of the treating solution. The excess solution was poured off and the damp sheet was immediately placed in an oven at 190° C. After three minutes the sheet was removed, washed in cold water, and then in dilute hydrochloric acid. After an acetone wash and drying, the treated surface had a foggy appearance.

The treated sheet was bonded to a sandblasted aluminum panel utilizing the adhesive of Example 4. The adhesive was cured for 16 hours at room temperature, contact pressure, and post-cured one hour at 250° F., with 10 p.s.i. pressure.

Three 1-inch wide strips were cut and peeled from the panel at a rate of 2 inches per minute. Bond strengths averaged 7, 8 and 9 lbs./in., respectively.

EXAMPLE 7

A 4" x 6" area of 10-mil Genetron VK-240 film was coated lightly with a treating solution containing approximately 10 grams of magnesium methoxide per 100 milliliters of methanol-isopropanol as a solvent. The coated sheet was heated in an oven at 190° C. for two minutes and then quenched in cold water. A rinse in dilute hydrochloric acid and then acetone removed the decomposition products from the film. The treated surface had a typical foggy appearance and was uniformly wetted by water indicating a surface activation had been obtained.

A strong bond was formed between the treated film and two parts of a standard epoxy resin such as Ciba 6030 (above) or more particularly Dow epoxy resin 331 and one part Versamid 125 as a curing agent.

EXAMPLE 8

The following is illustrative of a method of producing a laminate comprising a fluorine-containing plastic film adhered to a foamed plastic of any type.

Two thin films of Genetron VK-240 were utilized. One film was surface-coated with a small amount of sodium methoxide in methanol-tert-butanol solution and heated at 190° C. for three minutes. The treated sheet was quenched in cold water, washed with acetone and air dried. The treated surface had a characteristic foggy appearance.

The fluorocarbon-rigid plastic foam laminate was prepared as follows: The treated sheet was laid on a platen and a 4" x 6" rectangular mold having a depth of one inch and open at top and bottom was placed on top of the treated surface. The two components of a rigid urethane foam system were mixed and poured into the mold. (Such systems include, for example, (1) reaction product of hydroxyl-containing compound and tolylene diisocyanate as a prepolymer component and (2) hydroxyl-containing polyester resin, emulsifying agent, water and catalyst—usually tertiary amine.) The untreated film was laid on top of the mold contents and the platens were closed.

Expansion of the foam was complete in about three minutes. After 24 hours, the mold was dismantled and the laminate removed.

The untreated film showed no tendency to adhere to the foam and peeled off easily leaving a smooth glossy surface on the foam.

The treated film bonded strongly to the foam, however, and the film could be stripped off but only by rupturing the cell walls of the foam and a thin layer of foam was left attached to the treated fluorocarbon surface after stripping.

The invention is not limited to the examples. The adhesive used is not critical. Different temperatures can be employed for the alkoxide treatment, lower temperatures requiring a longer time and vice versa. Heating is desirable to initiate or hasten the reaction; but the effect of heating is different with the different polymers.

The invention is covered in the claims which follow.

What I claim is:

1. The method of treating the passive, heat-reflective surface of a fluorine-containing polymeric resin which comprises etching the same at an elevated temperature with an alkoxide of a metal selected from groups I, II and III of the periodic table.

2. The method of claim 1 in which the resin is a chlorotrifluoroethylene homopolymer.

3. The method of claim 1 in which the resin is a copolymer of chlorotrifluoroethylene and vinylidene fluoride.

4. The method of claim 1 in which the resin is polyvinyl fluoride.

5. The method of claim 1 in which the metal alkoxide is sodium methoxide.

6. The method of claim 1 in which the metal alkoxide is sodium ethoxide.

7. The method of producing a laminate which comprises treating the surface of a polymeric resin film according to the process of claim 1, washing the reaction product from the treated surface and applying an adhesive thereto, and then uniting a substrate to the adhesive.

8. The method of claim 7 in which the adhesive is an epoxy resin.

9. A passive and heat-reflective fluorine-containing polymeric resin a surface of which is etched by an alkoxide of a metal selected from groups I, II and III of the periodic table.

10. A film composed essentially of chlorotrifluoroethylene homopolymer, a surface of which resin is etched by an alkoxide of a metal selected from groups I, II and III of the periodic table.

11. A film composed essentially of copolymer of chlorotrifluoroethylene and vinylidene fluoride, a surface of which resin is etched by an alkoxide of a metal selected from groups I, II and III of the periodic table.

12. A film of polyvinyl fluoride, a surface of which film is etched by an alkoxide of a metal selected from groups I, II and III of the periodic table.

13. The resin material of claim 9 with adhesive covering the etched surface.

14. The resin material of claim 9 with adhesive covering the etched surface and a substrate united to the adhesive.

15. The film of claim 10 with adhesive covering the etched surface and a substrate united to the adhesive.

16. The film of claim 11 with adhesive covering the etched surface and a substrate united to the adhesive.

17. The film of claim 12 with adhesive covering the etched surface and a substrate united to the adhesive.

18. The material of claim 9 with an epoxy adhesive covering the etched surface.

19. The material of claim 9 with an epoxy adhesive covering the etched surface and a substrate united to the adhesive.

References Cited in the file of this patent

UNITED STATES PATENTS

| | | |
|---|---|---|
| 2,871,144 | Doban | Jan. 27, 1959 |
| 2,946,710 | Fields | July 26, 1960 |